United States Patent [19]

Strickland

[11] Patent Number: 4,844,011

[45] Date of Patent: Jul. 4, 1989

[54] CAT WASTE DISPOSAL SYSTEM

[76] Inventor: Terry A. Strickland, 3007 Bluestem, College Station, Tex. 77840

[21] Appl. No.: 9,690

[22] Filed: Feb. 2, 1987

[51] Int. Cl.$^4$ .............................................. A21K 29/00
[52] U.S. Cl. ........................................ 119/1; 119/22
[58] Field of Search ................... 119/1, 22, 17, 15, 28; 53/475

[56] References Cited

U.S. PATENT DOCUMENTS

| | | | |
|---|---|---|---|
| 595,121 | 12/1897 | Dimock | 119/22 |
| 2,039,783 | 5/1936 | Ebeling | 119/1 |
| 3,264,667 | 8/1966 | Frank | 119/22 |
| 3,316,880 | 5/1967 | Jungles et al. | 119/1 |
| 4,465,018 | 8/1984 | Mopper | 119/1 |
| 4,493,288 | 1/1985 | van der Kolk | 119/1 |

*Primary Examiner*—John J. Wilson
*Attorney, Agent, or Firm*—Dodge, Bush & Moseley

[57] ABSTRACT

A waste disposal system for providing and removing a controlled flow of absorbent cat litter is disclosed. The apparatus comprises a hopper for receiving and storing the litter in a flowable form. The hopper is provided with an exit passage at its lower end and a measured container is disposed beneath the exit passage. A horizontal conveyor belt is positioned below the exit passage movable between a utility position beneath the passage and a discharged position to operably dump the litter. A holding drawer is disposed beneath the conveyor belt for receiving the used material.

10 Claims, 2 Drawing Sheets

CAT WASTE DISPOSAL SYSTEM

BACKGROUND OF THE INVENTION

1. Field of the Invention

This invention relates generally to waste disposal systems, and particularly to a system for providing and then removing a controlled flow of a waste disposal material.

2. Background of the Invention

Domesticated animals or pets have recently been kept inside the house in order to protect them from the elements. This has required that the pet be provided with and trained to use a waste disposal system inside the house. Earthy clay cat litter is presently used to absorb and reduce the odor of urine and feces.

In the past this litter has been placed in a pan or box for use by the pet. The pan or box is changed as required by manually throwing out the used litter in the trash and replacing with new litter.

An apparatus that could automatically provide fresh litter and then later remove the used litter without requiring the pet owner to oversee all phases of the operation would be desirable. This automatic apparatus would be especially desirable when the pet owner is away from home for extended periods of time.

IDENTIFICATION OF OBJECTS OF THE INVENTION

One object of the invention is to provide a new and improved apparatus for providing and removing a controlled flow of waste disposal material.

It is another object of this invention to provide an automatic waste disposal system for providing and removing a controlled flow of absorbent cat litter.

It is another object of this invention to provide a waste disposal system wherein a hopper storing means volume is less than a holding means volume to operably aid in preventing overflow of the waste disposal system.

It is another object of the invention to provide an automatic waste disposal system which provides a measured and timed flow of litter.

SUMMARY OF THE INVENTION

These and other objects are attained in accordance with the present invention by providing a waste disposal system for providing to a surface and removing from the surface a controlled flow of absorbent cat litter.

The apparatus comprises a hopper means for receiving and storing the litter in a flowable form. The hopper means is provided with an exit passage at its lower end and a measured container is disposed beneath the exit passage. The exit passage communicates the hopper means with the measured container.

A base is provided below the container movable between a closed position to allow the measured container to fill with the litter and an open position to release the measured flow of litter onto a substantially horizontal conveyor belt positioned below the exit passage.

Furthermore, according to the invention the horizontal belt positioned below the exit passage is movable between a utility position beneath the passage and a discharge position to operably dump the litter. A motor is provided to timely move the belt from the utility position to the discharge position. A holding means is disposed beneath the conveyor belt for receiving the used litter.

According to the invention, the volume of the hopper storing means is less than the volume of the holding means to operably aid in preventing overflowing of the holding means of the automatic water disposal system.

BRIEF DESCRIPTION OF THE DRAWINGS

The objects, advantages and features of the invention which will become more readily apparent by reference to the drawings which are appended hereto and wherein like numerals indicate like parts and wherein an illustrative embodiment of the invention is shown, of which.

DESCRIPTION OF A PREFERRED EMBODIMENT

Referring to FIGS. 1-4, there is illustrated and automatic waste disposal system 10 for providing an removing a controlled flow of absorbent cat litter comprising a hopper means, generally designated 12, a horizontal belt surface, generally designated 14, and a holding means, generally designated 16.

It is highly desirable to provide an automatic waste disposal system 10 for pets which provides a measured amount of litter and thereafter removes and relaces the litter. Additionally, it is desirable to repeat these above tasks without the assistance of the pet owner as is accomplished by the apparatus described below.

Figure 1:
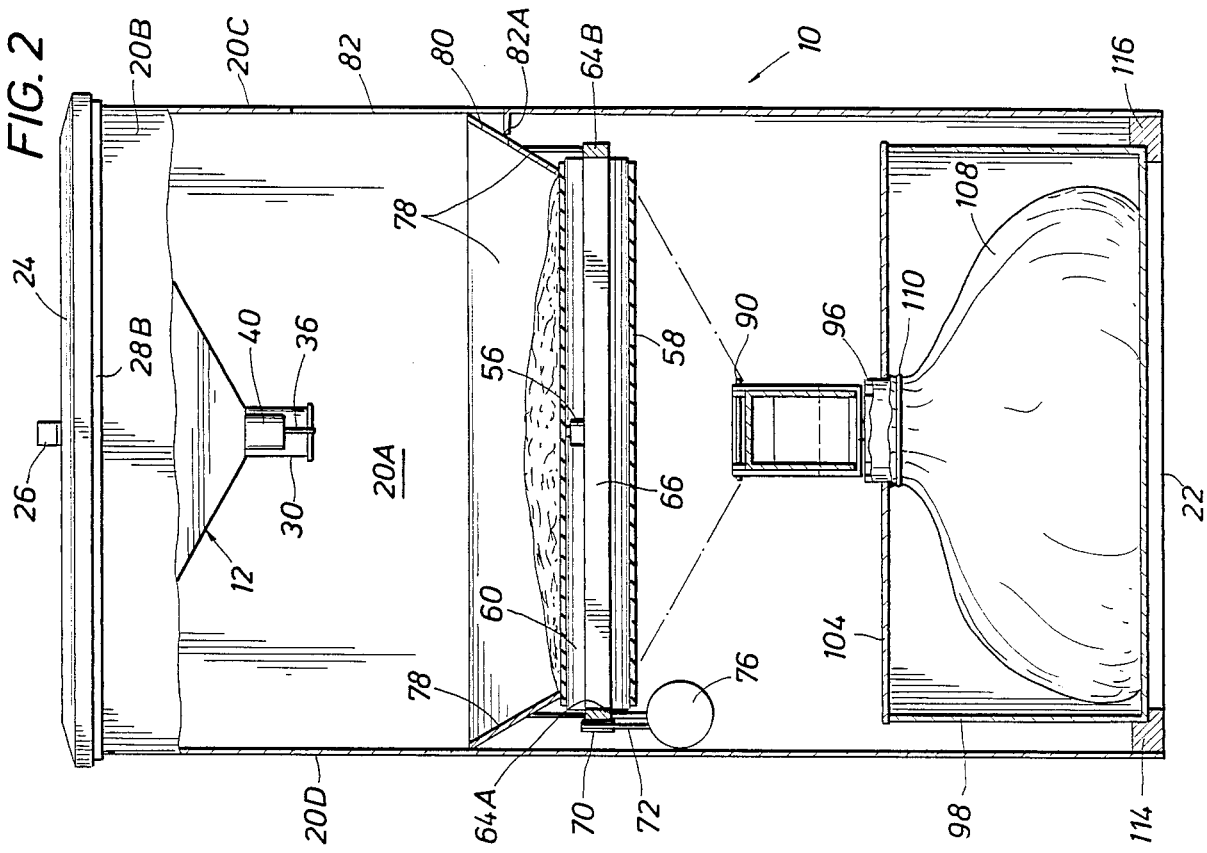
FIG. 1 is a section of an elevational view of the apparatus of the present invention illustrating the hopper, the conveyor belt system and the holding drawer.
Figure 2:
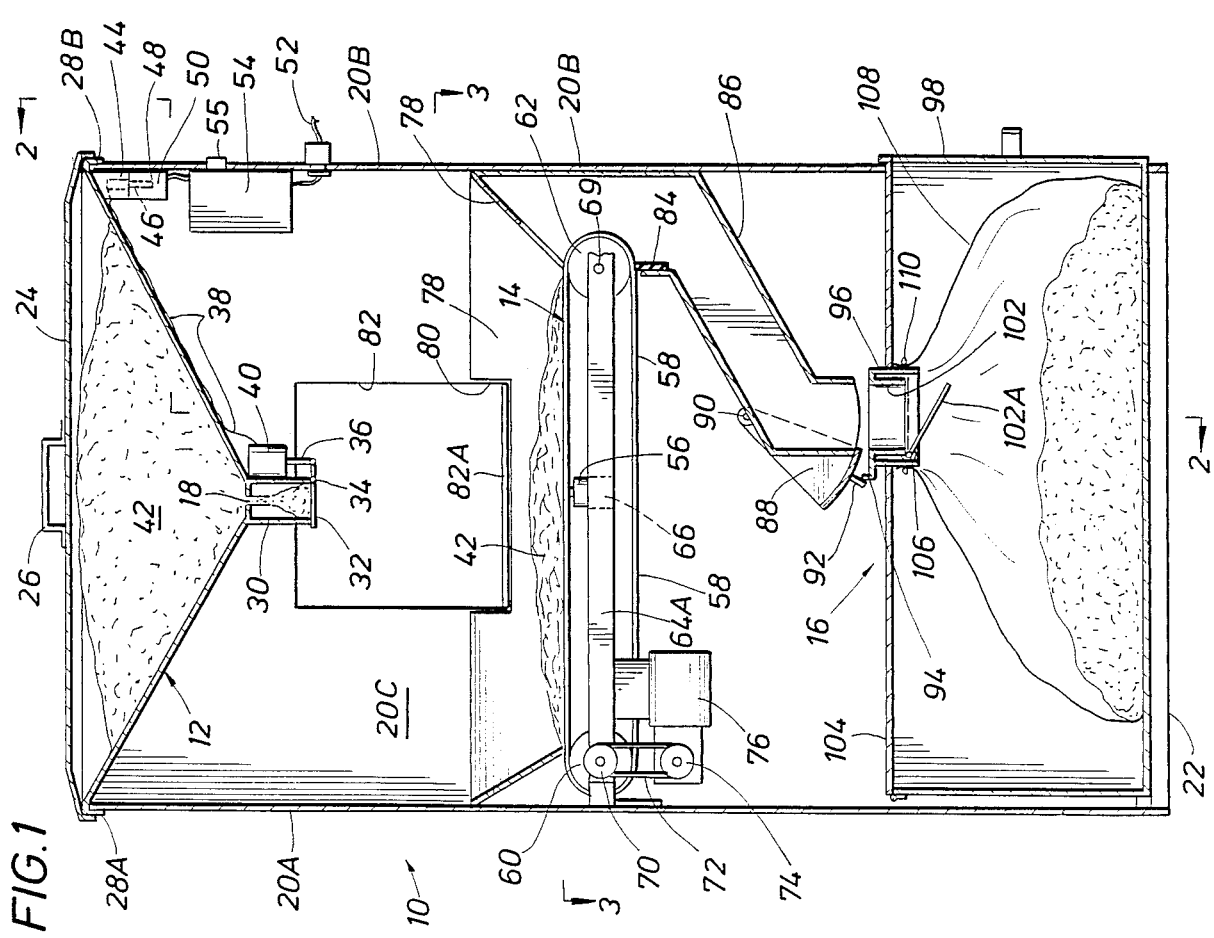
FIG. 2 is a broken sectional view of FIG. 1 taken along lines 2—2.

As best shown in FIGS. 1 and 2, the hopper means 12 is generally cone shaped. The larger opening at the top continuously inclines inwardly to the sized exit passage 18 at the lower end of the hopper means 12. In the preferred embodiment, the waste disposal system 10 is rectangular in shape having sidewalls 20 and a bottom 22. Though the preferred embodiment is rectangular in shape, other shapes including circular could be used.

The top of the system is provided with a removable rectangular lid 24 having a handle 26. The lid 24 and handle 26 are preferably fabricated from clear see through plastic to allow viewing though the lid into the hopper means 12. The hopper means 12 has downwardly facing lips 28A, 28B, 28C, and 28D received around the top of sidewalls 20A, 20B, 20C and 20D, respectively, to suspend the hopper means 12 from the sidewalls 20.

As best shown in FIG. 1, the sized exit passage 18 opens into a measured container 30 having a predetermined volume. The exit passage 18 communicates hopper means 12 containing the flowable litter to the measured container 30. Base 32 of container 30 pivots about pin 34 and arm 36 moves base 32 on command from an electrical signal provided through wire 38. Actuating means 40 for retracting and extending the arm 36 of base 32 is movable relative to the container 30 between a closed position to allow the measured container 30 to fill with the flowable material or litter 42 and an open position to operably provide a measured flow of the litter 42 from the container 30 to belt surface 14.

The hopper means 12 is provided with plug 44 having a male portion 46 electrically coupled to wire 38. Male portion 46 of plug 44 is aligned with the female portion 48 of socket 50 to provide automatic connection of the wire 38 to the power outlet 52 upon installing the hopper means 12 as described above.

A timer 54 is preferably electrically coupled between the power outlet 52 and the socket 50. Electrical coupling of the power outlet 52 to the actuating means 40 allows moving the base 32 between the open and closed positions. Though the use of an intermittent timer 54 is preferred to operate the system, a pressure sensitive means 56 positioned below belt surface 14 may be used by itself or in combination with the timer 54. The pressure sensitive means 56 may independently actuate the opening of base 32 and timely move the belt surface 14 after actuated by the pet.

Additionally, the present invention may include a manual actuating means 55 provided in timer 54 to open and close the base 32 and move the belt surface 14 as desired by the operator.

Figure 3:
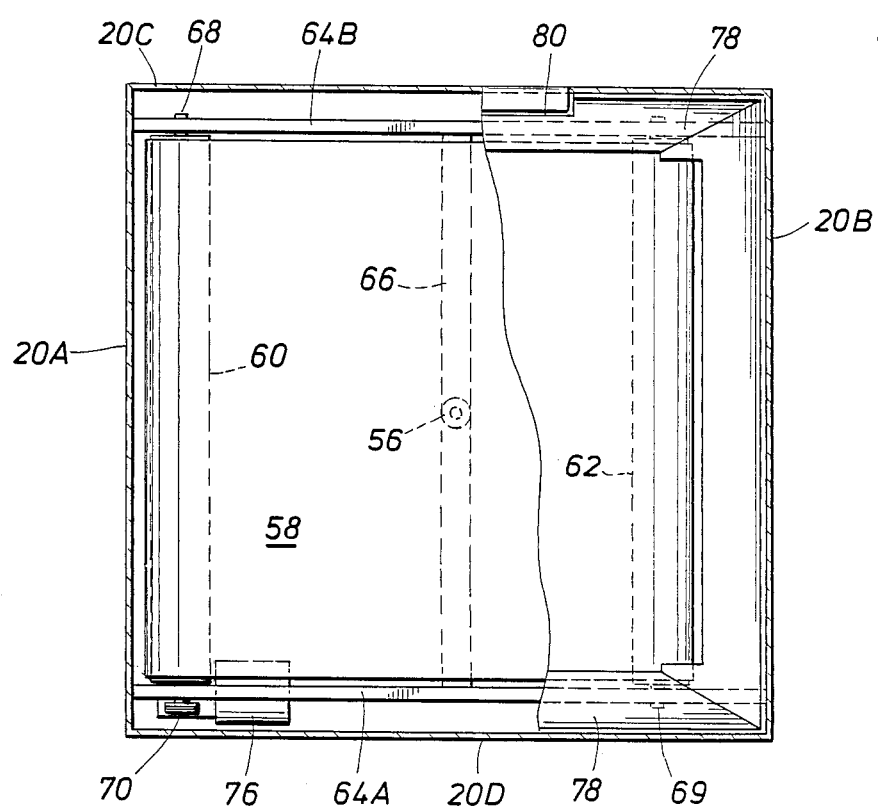
FIG. 3 is a broken sectional view taken along lines 3—3 of FIG. 1.

As best shown in FIGS. 1, 2 and 3, the means for removing the material 42 on the belt surface 14 is illustrated. The removing means comprises a continuous conveyor belt 58 fabricated from a continuous rubberized fabric positioned around roller 60 and roller 62 attached to a frame 64. Frame 64 includes longitudinal members 64A and 64B spaced apart by lateral member 66. Longitudinal members 64A and 64B are attached at one end to sidewall 20A and on the other end to sidewall 20B.

The rollers 60 and 62 have respective pins 68 and 69 therethrough extending through holes in the longitudinal members 64A and 64B. A grooved pulley wheel 70 is fixedly secured at one end of the pin 68 of the roller 60 to receive a belt 72 wrapped around a second pulley wheel 74. The second pulley wheel 74 is rotated by a motor 76 to turn roller 60 and therefore belt 58. The motor 76 is preferably a one horsepower motor capable of rotating the conveyor belt 58 and the litter 42 thereon from a utility position beneath the passage 18 to a discharged position. This would require the portion of belt 58 touching roller 60 be moved clockwise, as shown in FIG. 1, to touch roller 62 to dump the used litter in the holding means 16.

The system 10 is further provided with a removable incline guide means 78 which aids in directing the litter to the central location of the belt surface 14 and to direct the litter to the holding means 16. The inclined means 78 is fabricated to provide a recessed area 80 aligned with opening 82 of sidewall 20C which permits the pet to enter the system, as best shown in FIGS. 1, 2 and 3.

A rubber wiper 84 extending the width of the belt surface 14 cleans the conveyor belt 58 upon rotation of the rollers 60 and 62. The wiper 84 dumps the litter 42 into the holding means 16 via chute 86. The wiper 84 engages the belt to allow effective cleaning yet does not provide excessive drag thereon. Chute 86 directs the litter 42 from sidewall 20B to approximately the lower mid-section of the system 10.

Figure 4:
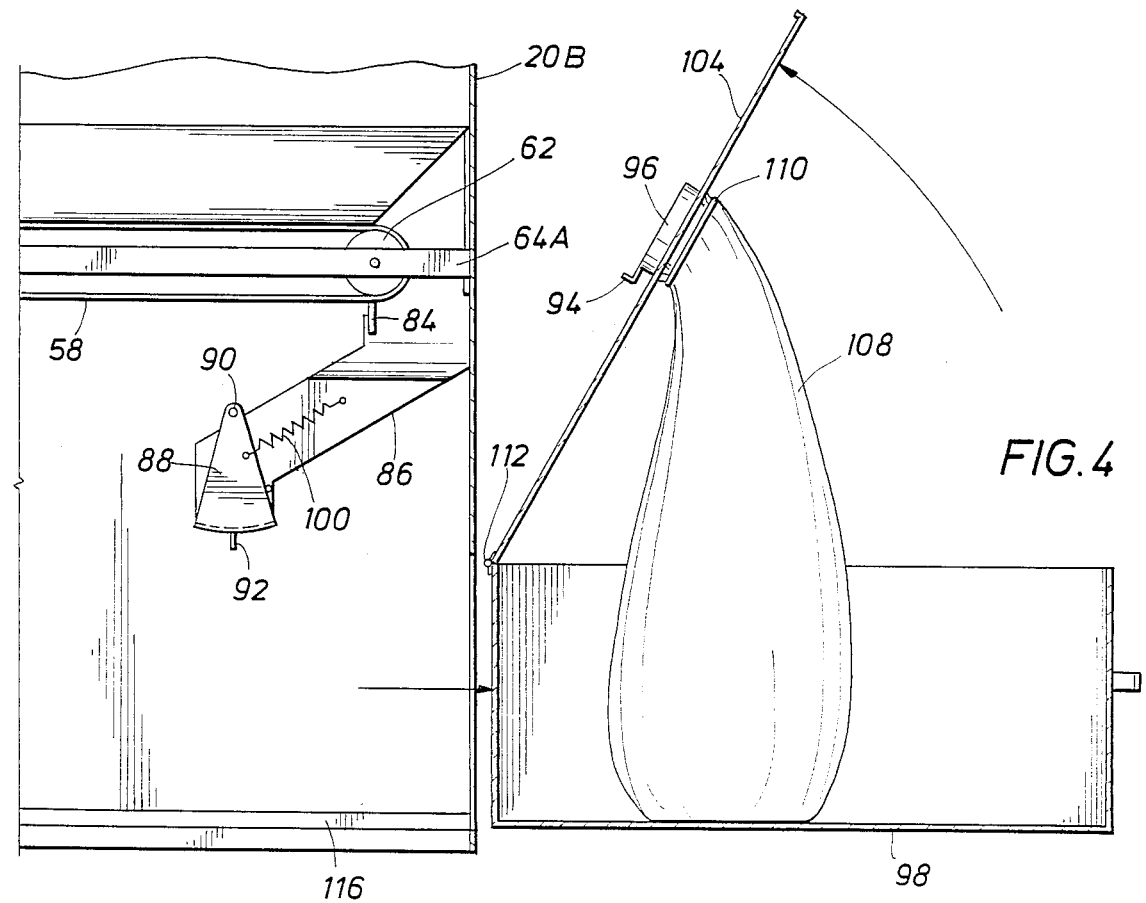
FIG. 4 is a partial view similar to FIG. 1 illustrating the holding drawer in the pulled out position.

In the preferred embodiment, a gate 88 pivots about pin 90 secured to chute 86. Dog 92 of gate 88 is horizontally aligned to engage dog 94 of cylinder 96. When the drawer 98 is in the operating position, as shown in FIGS. 1 and 2, the dog 94 moves the gate 88 to the open position. When the drawer 98 is pulled out, the spring 100 closes the gate 88 as shown in FIG. 4. The predetermined force of spring 100 resists the weight of accumulated litter 42 in chute 86 against gate 88 to prevent inadvertent flow of litter from the chute 86 when the drawer is pulled out.

In the preferred embodiment a pivotable closure means 102 having closing plate 102A is provided in cylinder 96 of drawer cover 104 for inhibiting the odors from rising from the holding means 16 while allowing dumping from the chute 86 through open gate 88 to the holding means 16.

The holding means comprises the cylinder 96 securely fixed in the solid cover 104. Outwardly facing annular groove 106 is disposed at the bottom portion of cylinder 96, as best shown in FIGS. 1, 2 and 4. Additionally, the holding means 16 includes the drawer 98 movable from a first position, as shown in FIGS. 1 and 2, for receiving the material from the chute 86 and a second position, as best shown in FIG. 4, for removing a replacing disposable plastic bag 108. The plastic bag 108 is positioned around the groove 106 of cylinder 96 by O-ring fastener 110 to secure the bag 108 onto the cylinder 96.

As best shown in FIG. 4, the drawer 98 may be pulled out and the cover 104 pivoted up about the pin 112 to provide easy access to the removable disposable plastic bag 108. Channel means 114 and 116 are provided adjacent the base 22 for guiding the drawer 98.

Preferably the volume of the hopper storing means 12 is less than the volume of the holding means 16 to aid in preventing overflowing of the holding means 16 of the automatic waste disposal system. The angle of repose of the litter is considered in the sizing of the holding means so that the total volume of litter placed in the hopper storing means can be received in an initially empty holding means. This sizing of the system aids in the inhibiting of the litter odor from rising from the holding mean s because of a clogged closure means 102.

OPERATION

In the operation of the invention, the operator of the system would lift the lid 24 by the handle 26 to empty a volume of litter 42 into the hopper means 12. Then the operator would decide whether to manual operate the system, to use the pressure sensitive device 56 or to use the timer 54.

If the timer 54 is set for 24 hours, the timer would timely send a signal through wire 38 to actuating means 40 to empty the full measured container 30 onto the belt surface 14. Base 32 will only remain open long enough to empty the initial volume of litter contained in the container 30, though a small amount of litter will continue to run through the sized exit passage 18.

The litter 42 now positioned on the belt surface 14 is ready to be used. The pet enters through the opening 82 and may use the ledge 82A when jumping from the ground to enter the system. Preferably the ledge 82A is approximately twelve inches or one foot above the ground. Other opening heights could be used as desirable for different types of pets at different age groups or a ramp system could be provided.

The pet then positions itself on the litter on belt surface 14 and voids itself thereon and exits. If the pressure sensitive means 56 is used, the exit of the pet would then command the motor 76 to rotate the belt 58 to dump the amount of litter 42 into the chute 86, as discussed above. If the timer is used, the used litter will remain until the timer actuates the motor 76 to dump the used litter into the chute 86. The used litter is then wiped clean from the belt 58 by rubber wiper 84. The used litter travels down chute 86 past open gate 88 and by weight actuation opens the plate 102A of closure means 102 to the plastic bag 108 in drawer 98.

After the used litter has run into the bag 108 and no further weight acts on plate 102A, the plate returns to a closed position, as shown in dotted lines, horizontal with the cover 104 to inhibit odors from rising from the holding means.

To change the bag 108 the operator would pull out the drawer, as best shown in FIG. 4, and pivot the cover 104 about pin 102. The operator would then roll up O-ring 110 to release the bag 108. The bag is then removed and disposed of and a new bag is positioned about the groove 106 and the O-ring fastener 110 is again placed thereon. The cover 104 is then returned to its down position and the drawer pushed back in which engages the dog 94 of cylinder 96 with dog 92 of gate 88. The gate 88 is then moved from its closed position to the open position, as shown in FIGS. 1 and 2.

Various modifications and alterations in the described apparatus and methods will be apparent to those skilled in the art of foregoing description which does not depart from the true spirit of the invention. For this reason, these changes are desired to be included in the appended claims. The appended claims recite the only limitation to the present invention in the descriptive manner which is employed for setting forth the embodiments and is to be illustrative and not limitative.

What is claimed is:

1. Apparatus for providing and removing a controlled flow of a waste disposal material for a carnivorous mammal, comprising
    a hopper means for receiving and storing the material in a flowable form, said hopper means having an exit passage at its lower end,
    means for controlling the flow of material from said exit passage,
    a substantially horizontal surface positioned beneath said exit passage for receiving the controlled flow of the material from said passage, and
    means for removing the material on said surface to operably provide a waste disposal system,
    wherein said controlling means comprises
    a measured container disposed beneath said exit passage,
    said exit passage communicating said hopper means with said container,
    a base of said container movable relative to said container between a closed position to allow the measured container to fill with the material and an open position to operably provide a measured flow of material, and
    means for moving said base between said open and closed positions.

2. Apparatus of claim 1 further comprising
    means disposed beneath said surface for receiving and holding the removed material,
    wherein a volume of said hopper storing means is less than a volume of said holding means to operably aid in preventing overfilling the holding means of the waste disposal system.

3. Apparatus of claim 2 further comprising
    closure means for inhibiting the odor from said holding means while allowing dumping from said horizontal surface to said holding means.

4. Apparatus of claim 1 wherein said horizontal surface is a conveyor belt and said removing means comprises a conveyor belt system.

5. Apparatus of claim 1 wherein said base moving means is actuated over a period of time.

6. Apparatus of claim 1 wherein said base moving means is actuated after use of the apparatus by the mammal.

7. Apparatus of claim 1 wherein said base moving means is manually actuated.

8. A waste disposal system for providing and removing a controlled flow of absorbent material for a carnivorous mammal, comprising,
    a hopper means for receiving and storing the material in a flowable form, said hopper means having an exit passage at its lower end,
    means for controlling the flow of material from said exit passage,
    a substantially horizontal surface positioned beneath said exit passage for receiving a controlled flow of the material from said passage, said surface movable relative to said passage between a utility position beneath the passage and a discharged position to operably dump the material.
    means for moving said surface from said utility position to said discharged position, and
    means disposed beneath said surface for receiving and holding the dumped material,
    wherein said horizontal surface is a conveyor belt and said moving means comprises a conveyor belt system, and further comprising
    a wiper means engaging said conveyor belt for cleaning the surface in the discharged position and to aid in dumping the material into said receiving and holding means, and wherein said controlling means comprises
    a measured container disposed beneath said exit passage,
    said exit passage communicating said hopper means with said container,
    a base of said container movable relative to said container between a closed position to allow the measured container to fill with the material and an open position to operably provide a measured flow of material, and
    means for moving said base between said open and closed positions.

9. Apparatus of claim 8 wherein a volume of said hopper storing means is less than a volume of said holding means to operably aid in preventing overfilling the holding means of the automatic waste disposal system.

10. Apparatus of claim 8 wherein said holding means comprises
    a plastic bag for holding the material,
    a drawer movable from a first position for receiving and holding said material and a second position for replacing the plastic bag, and
    removable cover having a conduit, said plastic bag being attached to said conduit for receiving the material.

* * * * *